United States Patent [19]

Bezborodov et al.

[11] Patent Number: 4,605,510

[45] Date of Patent: Aug. 12, 1986

[54] LIQUID CRYSTAL COMPOSITION FOR ELECTROOPTICAL DEVICES FOR PRESENTATION OF INFORMATION

[75] Inventors: Vladimir S. Bezborodov; Viktor A. Konovalov; Jury L. Ptashnikov; Vladimir M. Astafiev; Anatoly A. Minko; Anatoly I. Dudarchik, all of Minsk; Galina A. Zanegina; Anatoly M. Poimanov, both of Ordzhonikidze, all of U.S.S.R.

[73] Assignee: Nauchno-Issledovatelsky Institut Prikladnykh Problem Imeni A.N. Sevchenko, Minsk, U.S.S.R.

[21] Appl. No.: 694,688

[22] Filed: Jan. 25, 1985

[51] Int. Cl.⁴ .................. C09K 3/34; G02F 1/13
[52] U.S. Cl. ....................... 252/299.66; 252/299.6; 350/350 R; 558/414
[58] Field of Search .............. 252/299.66, 299.63, 252/299.65, 299.6; 350/350 R; 260/465 D

[56] References Cited

U.S. PATENT DOCUMENTS

| | | | |
|---|---|---|---|
| 3,951,846 | 4/1976 | Gavrilovic | 252/299.65 |
| 4,013,582 | 3/1977 | Gavrilovic | 252/299.63 |
| 4,029,594 | 6/1977 | Gavrilovic et al. | 252/299.65 |
| 4,113,647 | 9/1978 | Coates et al. | 252/299.63 |
| 4,207,252 | 6/1980 | Sato et al. | 252/299.6 |
| 4,211,666 | 7/1980 | Inukai et al. | 252/299.6 |
| 4,261,651 | 4/1981 | Gray et al. | 252/299.63 |
| 4,261,652 | 4/1981 | Gray et al. | 252/299.62 |
| 4,505,837 | 3/1985 | Romer et al. | 252/299.6 |

FOREIGN PATENT DOCUMENTS 2078727 1/1982 United Kingdom ............ 252/299.6

Primary Examiner—Teddy S. Gron
Attorney, Agent, or Firm—Burgess, Ryan & Wayne

[57] ABSTRACT

A liquid crystal composition for electrooptical devices for presentation of information comprising 2 to 4 parts by weight of liquid crystal 4-(4'-cyanodiphenyl) esters of trans-4"-n-alkylcyclohex-2-enecarboxylic acids of the general formula:

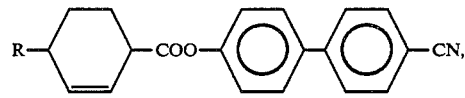

wherein R is a normal-structure $CH_3$-$C_7H_{15}$ radical, and 6 to 8 parts by weight of 4-n-pentyl-4'-cyanodiphenyl. The composition is characterized by a low temperature of the formation of the liquid crystal phase (below $-12°$ C.), a wide temperature range of the existence of this phase (90°–100° C.), a small threshold voltage (1.1–1.2 V), a short time of switching-on and -off (45 and 65 msec respectively).

1 Claim, No Drawings

LIQUID CRYSTAL COMPOSITION FOR ELECTROOPTICAL DEVICES FOR PRESENTATION OF INFORMATION

FIELD OF THE INVENTION

The present invention relates to liquid crystal compositions for electrooptical devices for presentation of information (electronic watch, microcalculators, display boards and the like).

BACKGROUND OF THE INVENTION

Known in the art is a composition for electrooptical devices for presentation of information consisting of 14% by weight of 4-(trans-4''-n-butylcyclohexylmethoxy)-4'-cyanodiphenyl and 86% by weight of 4-n-pentyl-4'-cyanodiphenyl (cf. Mol. Cryst.Liq.Cryst., vol. 53, 1979; Gordon & Breach Science Publishers, Ltd., London; G. W. Gray, D. G. McDonnel "Liquid Crystal Compounds Incorporating the Trans-1,4-Substituted Cyclohexene Ring System", p.158).

This prior art composition has a disadvantage residing in a relatively high temperature of the formation of a liquid crystal (nematic) phase equal to 11° C. and a narrow temperature range of the existence of the liquid crystal phase (47° C.) which limits applications of this composition in electrooptical devices for presentation of information.

These disadvantages are caused by the fact that the composition incorporates 4-(trans-4''-n-butylcyclohexylmethoxy)-4'-cyanodiphenyl having a high temperature of the formation of the liquid crystal (nematic) phase (93° C.), a high heat of crystal-liquid crystal phase transition ($\Delta H = 7.5$ kcal/mol) and featuring a temperature range of the existence of the liquid-crystal phase equal to 100° C. (see the same publ., p. 155).

SUMMARY OF THE INVENTION

It is an object of the present invention to provide a liquid crystal composition for electrooptical devices for presentation of information which would have a low temperature of the formation of the liquid-crystal phase.

It is another object of the present invention to provide a liquid crystal composition for electrooptical devices for presentation of information which would have a broad temperature range of the existence of the liquid crystal phase.

These and other objects of the present invention are accomplished by a liquid crystal composition for electrooptical devices for presentation of information which comprises liquid crystal 4-(4'-cyanodiphenyl)esters of trans-4''-n-alkylcyclohex-2-enecarboxylic acids of the general formula:

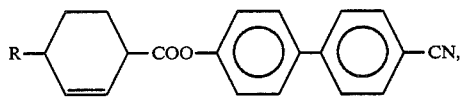

wherein R is a normal-structure $CH_3-C_7H_{15}$ radical, and a liquid crystal 4-n-pentyl-4'-cyanodiphenyl; the components are present in the composition in the following proportions, parts by weight:
4-n-pentyl-4'-cyanodiphenyl: 6 to 8
4-(4'-cyanodiphenyl)esters of trans-4''-n-alkylcyclohex-2-enecarboxylic acids: 2 to 4.

The liquid crystal compounds, namely: 4-(4'-cyanodiphenyl)esters of trans-4''-n-alkylcyclohex-2-enecarboxylic acids employed in the composition according to the present invention feature a low temperature of the formation of the liquid crystal (nematic) phase (42°-50° C.), a wide temperature range of the existence of this phase (140° C.), a low heat of crystal-to-liquid crystal phase transition ($\Delta H = 2.7-3.2$ kcal/mol). These properties of the above-mentioned esters ensure the production of a liquid crystal composition with a low temperature of the formation of the liquid crystal (nematic) phase (for example below $-12°$ C.) along with a wide temperature range of the existence of this phase (90°-100° C.). Furthermore, the liquid crystal composition according to the present invention features a low threshold voltage (1.1-1.2 V), a short time of switching-on and -off (for example, 45 and 65 msec respectively).

It is not advisable to use a liquid crystal composition with a content of 4-n-pentyl-4'-cyanodiphenyl of less than 6 parts by weight, since the increase of the content of the second component can result in an elevated temperature of the formation of the liquid crystal phase and in impaired electrooptical characteristics of the liquid crystal composition (extended time of switching-on and -off).

It is neither advisable to use a liquid crystal composition with a content of 4-n-pentyl-4'-cyanodiphenyl of above 8 parts by weight, since a decreased content of the second component results in a lowered upper limit of the temperature range of the existence of the liquid crystal phase.

DETAILED DESCRIPTION OF THE INVENTION

The liquid crystal composition according to the present invention is prepared by intermixing 4-n-pentyl-4'-cyanodiphenyl and 4-(4'-cyanodiphenyl)ester of a trans-4''-n-alkyl-cyclohex-2-enecarboxylic acid, followed by heating of the mixture components till an isotropic melt is formed, thorough intermixing of the melt and cooling thereof to room temperature.

The 4-(4'-cyanodiphenyl)esters of trans-4''-n-alkyl-cyclohex-2-enecarboxylic acids incorporated in the composition according to the present invention are obtained by a known reaction, namely by interaction of trans-4-n-alkylcyclohex-2-enecarboxylic acid chlorides with 4-hydroxy-4'-cyanodiphenyl in the presence of pyridine. The process for preparing these liquid crystal compounds comprises stirring a mixture of 0.3 mol of a trans-4-n-alkylcyclohex-2-enecarboxylic acid (wherein the alkyl is a normal-structure $CH_3-C_7H_{15}$ radical), 0.4 mol of thionyl chloride, 0.5 mol of pyridine in anhydrous diethyl ether for 1.5 hour. Then 0.3 mol of 4-hydroxy-4'-cyanodiphenyl and 0.5 mol of pyridine are added to the mixture. The mixture is allowed to stand for about 12 hours at room temperature. Thereafter, the ethereal solution of the desired product is washed with water and dried with anhydrous sodium sulphate. The residue obtained after distilling-off the solvent is recrystallized from a mixture of methanol and benzene. The yield of the desired product is 50-60% as calculated for the amount of the acid employed.

The synthesized compound at room temperature comprise white odourless substances.

Gross formulae of the thus-obtained compounds have been justified by the data of elemental analysis (Table 1) and by the results of IR and PMR spectroscopy.

Intensive absorption bands at 1,725 and 2.230 cm$^{-1}$ in IR spectra correspond to stretching vibrations of carbonyl of the ester group and to stretching vibrations of the nitrile group. The signals within the range of 7.83–7.00, 5.7 and 3.17 ppm in PMR spectra belong to protons of aromatic rings, to protons at the double bond and to the proton located at the first carbon atom of the cyclohexene ring.

The temperature and heat of phase transitions have been determined by means of a differential scanning calorimeter "Perkin-Elmer DSC-2". The results of the measurements are shown in Table 1 hereinbelow.

As it is seen from Table 1, the 4-(4'-cyanodiphenyl)esters of trans-4''-n-alkylcyclohex-2-enecarboxylic acids employed in the composition according to the present invention have low temperatures of the formation of the liquid crystal phase (for example, 42.5° C.), a wide temperature range of the existence of the liquid crystal phase (140° C.), a low heat of crystal-to-liquid crystal phase transition (for example, 2.7 kcal/mol).

Electrooptical characteristics of the composition according to the present invention are determined at room temperature by measuring intensity of the light passing through a liquid crystal cell placed between two crossing polaroids. The gap between the electrodes of the liquid crystal cell is 12 μm. Onto the cell square-shape electric pulses were applied at the sequence frequency of 32 Hz. The working voltage is 3 V.

Formulations of the liquid crystal composition according to the present invention, its electrooptical characteristics (time of switching-on and -off, threshold voltage), as well as the temperature range of the existence of the liquid crystal (nematic) phase are shown in Table 2 hereinbelow.

TABLE 1

| Nos | Compounds incorporated in liquid crystal composition with the following meanings of R in the general formula | Temperature range of the existance of the liquid crystal phase, °C. | Heat of the crystal-to-liquid crystal phase transition, $\Delta H$, kcal/mol | Found, % | | | Gross formula | Calculated, % | | |
|---|---|---|---|---|---|---|---|---|---|---|
| | | | | C | H | N | | C | H | N |
| 1 | 2 | 3 | 4 | 5 | 6 | 7 | 8 | 9 | 10 | 11 |
| 1 | $CH_3$ | 85.5–168.5 | — | 79.5 | 6.1 | 4.3 | $C_{21}H_{19}NO_2$ | 79.5 | 6.0 | 4.4 |
| 2 | $C_2H_5$ | 58–189 | 3.0 | 79.6 | 6.2 | 4.4 | $C_{22}H_{21}NO_2$ | 79.8 | 6.3 | 4.2 |
| 3 | $n-C_3H_7$ | 59–203 | 3.3 | 80.1 | 6.7 | 4.0 | $C_{23}H_{23}NO_2$ | 80.0 | 6.6 | 4.0 |
| 4 | $n-C_4H_9$ | 42.5–197 | 2.7 | 80.2 | 7.1 | 4.0 | $C_{24}H_{25}NO_2$ | 80.2 | 7.0 | 3.9 |
| 5 | $n-C_5H_{11}$ | 48.5–189 | 3.2 | 80.5 | 7.4 | 3.9 | $C_{25}H_{27}NO_2$ | 80.4 | 7.2 | 3.8 |
| 6 | $n-C_6H_{13}$ | 44–186 | — | 80.7 | 7.7 | 3.7 | $C_{26}H_{29}NO_2$ | 80.6 | 7.5 | 3.6 |
| 7 | $n-C_7H_{15}$ | 65–185 | 3.3 | 80.9 | 7.7 | 3.6 | $C_{27}H_{31}NO_2$ | 80.8 | 7.7 | 3.5 |

TABLE 2

| | Content of the components in the liquid crystal composition, parts by weight | | | | | | |
|---|---|---|---|---|---|---|---|
| Nos | 4-n-pentyl-4'-cyanodiphenyl | Compound of the general formula with R = $n-C_3H_7$ | Compound of the gemeral formula with R = $n-C_5H_{11}$ | Temperature range of the existance of the liquid crystal (nematic) phase, °C. | Time of switching-on, msec | Time of switching-off, msec | Threshold voltage, V |
| 1 | 2 | 3 | 4 | 5 | 6 | 7 | 8 |
| 1 | 7 | 3 | — | 5–75 | 120 | 150 | 1.1 |
| 2 | 6.5 | 3.5 | — | (−5)–(+85) | 130 | 150 | 1.1 |
| 3 | 6 | 4 | — | 5–90 | 160 | 150 | 1.2 |
| 4 | 8 | — | 2 | below $(-12)^x$–(+70) | 45 | 60 | 1.1 |
| 5 | 7 | — | 3 | below $(-12)^x$–(+87) | 100 | 65 | 1.1 |
| 6 | below $(-12)^x$–(+105) | 110 | 80 | 1.2 | | | |

$^x$The liquid crystal composition was not crystallized when kept for 3–4 months at the temperature of $(-12)^\circ$ C.

As it follows from the above Table 2, the bicomponent liquid crystal composition according to the present invention has a low temperature of the formation of the liquid crystal (nematic) phase, a wide range of the existence of the liquid crystal phase and electrooptical characteristics which enable an extensive use of this composition in various electrooptical devices for presentation of information.

What is claimed is:

1. A liquid crystal composition for electrooptical devices for presentation of information comprising liquid crystal 4-(4'-cyanodiphenyl)esters of trans-4''-n-alkylcyclohex-2-enecarboxylic acids of the general formula:

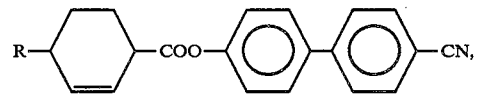

wherein R is a normal-structure $CH_3$—$C_7H_{15}$ radical, and a liquid crystal 4-n-pentyl-4'-cyanodiphenyl, the components being employed in the following proportions, parts by weight:

4-(4'-cyanodiphenyl)esters of trans-4''-n-alkylcyclohex-2-enecarboxylic acids: 2 to 4
4-n-pentyl-4'-cyanodiphenyl: 6 to 8.

* * * * *